(12) United States Patent
Sawano

(10) Patent No.: US 7,108,436 B2
(45) Date of Patent: Sep. 19, 2006

(54) IMAGE FORMING APPARATUS, COMMUNICATION APPARATUS, APPARATUS SETTING METHOD, PROGRAM FOR IMPLEMENTING THE METHOD, AND STORAGE MEDIUM STORING THE PROGRAM

(75) Inventor: Yasuaki Sawano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/223,752

(22) Filed: Sep. 9, 2005

(65) Prior Publication Data

US 2006/0051149 A1    Mar. 9, 2006

(30) Foreign Application Priority Data

Sep. 9, 2004  (JP) ............................. 2004-262798

(51) Int. Cl.
  *B41J 11/44*  (2006.01)
  *B41J 7/18*  (2006.01)
  *H04M 11/00*  (2006.01)

(52) U.S. Cl. .................... 400/76; 400/406; 379/100.05

(58) Field of Classification Search ............... 400/76, 400/406; 379/100.05, 94, 93, 100.08, 100.09, 379/100.14; 358/1.16, 1.9, 1.15; 709/217, 709/219, 228, 203
See application file for complete search history.

(56) References Cited

U.S. PATENT DOCUMENTS

| | | | | |
|---|---|---|---|---|
| 4,751,727 A | * | 6/1988 | Brahm et al. | ................. 379/28 |
| 5,027,386 A | | 6/1991 | Hisano | ................. 379/100.05 |
| 6,389,121 B1 | * | 5/2002 | Terao | .................... 379/100.08 |
| 6,614,892 B1 | * | 9/2003 | Hashimoto et al. | .... 379/100.14 |

FOREIGN PATENT DOCUMENTS

| | | |
|---|---|---|
| JP | 10-079817 | 3/1998 |
| JP | 2001-337797 | 12/2001 |

\* cited by examiner

*Primary Examiner*—Andrew H. Hirshfeld
*Assistant Examiner*—Wasseem H. Hamdan
(74) *Attorney, Agent, or Firm*—Cowan, Liebowitz & Latman, P.C.

(57) ABSTRACT

An image forming apparatus in which apparatus setting information registered in at least one of other apparatuses connected to the image forming apparatus via a communication line is obtained from the other apparatuses. The apparatus setting information of the other apparatuses which is not registered in the image forming apparatus is extracted out of the obtained apparatus setting information of the other apparatuses and is displayed on a display together with the apparatus setting information registered in the image forming apparatus. Desired apparatus setting information is selected out of the displayed apparatus setting information and a setting operation corresponding to the selected apparatus setting information is performed.

10 Claims, 14 Drawing Sheets

IMAGE FORMING APPARATUS,
COMMUNICATION APPARATUS,
APPARATUS SETTING METHOD,
PROGRAM FOR IMPLEMENTING THE
METHOD, AND STORAGE MEDIUM
STORING THE PROGRAM

BACKGROUND OF THE INVENTION

1. Field of the Invention

The present invention relates to an image forming apparatus, and a communication apparatus, which are connectable to other apparatuses via a communication line, an apparatus setting method, a program for implementing the method, and a storage medium storing the program.

2. Description of the Related Art

Conventionally, mode setting related to functions and operations of an apparatus is performed by an operator inputting via a user interface provided in the apparatus. Here, as examples of the mode, there are modes in which a facsimile destination, an e-mail destination, or the like is set. Once such mode setting is performed, when transmitting an image to the same destination next time, the user can save the trouble of setting the same destination by calling up the set mode.

However, in an office environment in which a plurality of apparatuses exist on a local area network (LAN), even if mode setting is performed in one of the plurality of apparatuses, this mode setting is not reflected in the other apparatuses so that userfriendliness differs with each apparatus. To provide the same level of userfriendliness for all the apparatuses, mode setting must be performed in all the apparatuses, which requires a time-consuming operation.

Therefore, in Japanese Patent Laid-Open Patent Publication (Kokai) No. 2001-337797, there has been proposed a technique in which, in apparatuses like computer terminals connected to each other via a communication line like LAN, one of the apparatuses generates apparatus setting information related to setting of a user mode (information for performing setting related to functions and operations of another apparatus to be set, which is transmitted from the apparatus connected via the communication line) in response to an operation by an operator, and send the generated apparatus setting information to the other apparatus to be set via the communication line, and then the other apparatus to be set receives the transmitted apparatus setting information and registers the same in a memory of the apparatus to be set. With this technique, the operator can perform mode setting easily by selecting one of user modes registered in the apparatus if necessary.

However, in the above-mentioned prior art, to update the apparatus setting information, new apparatus setting information has to be transmitted to each apparatus, and at the time of operating each apparatus, the new apparatus setting information has to be registered, thus requiring a complicated operation.

SUMMARY OF THE INVENTION

It is an object of the present invention to provide an image forming apparatus, a communication apparatus, and an apparatus setting method, which are capable of providing the same level of userfriendliness for all apparatuses connected via a communication line, without performing the same setting for all the apparatuses, a program for implementing the method, and a storage medium storing the program.

To attain the above object, in a first aspect of the invention, there is provided an image forming apparatus capable of registering apparatus setting information for performing setting of at least one of functions or operations thereof, comprising an acquiring unit that obtains apparatus setting information registered in at least one other apparatus connected to the image forming apparatus via a communication line, from the other apparatus, an extracting unit that extracts the apparatus setting information of the other apparatus which is not registered in the image forming apparatus out of the apparatus setting information of the other apparatus obtained by the acquiring unit, a display unit that displays on a display the apparatus setting information of the other apparatus which is not registered in the image forming apparatus and which has been extracted by the extracting unit, together with the apparatus setting information registered in the image forming apparatus, an information selecting unit that selects desired apparatus setting information out of the apparatus setting information of the other apparatus which is not registered in the image forming apparatus and the apparatus setting information registered in the image forming apparatus, which are displayed by the display unit, and a setting unit that performs setting of function or operation corresponding to the selected apparatus setting information.

Preferably, the image forming apparatus comprises a registration selecting unit that selects whether or not the extracted apparatus setting information of the other apparatus which is not registered in the image forming apparatus is to be registered as apparatus setting information of the image forming apparatus.

Preferably, the image forming apparatus comprises a data transmitting unit that transmits data to a desired transmission destination via the communication line, and the apparatus setting information is for setting the transmission destination.

More preferably, the apparatus setting information is information selected from the group consisting of a facsimile number of the transmission destination, an e-mail address of the transmission destination, a folder of the transmission destination, and a box of the transmission destination.

To attain the above object, in a second aspect of the invention, there is provided a communication apparatus capable of registering apparatus setting information for setting the communication apparatus, comprising an acquiring unit that obtains apparatus setting information registered in at least one other apparatus connected to the image forming apparatus via a communication line, from the other apparatus, an extracting unit that extracts the apparatus setting information of the other apparatus which is not registered in the communication apparatus, out of the apparatus setting information of the other apparatus obtained by the acquiring unit, a display unit that displays on a display the apparatus setting information of the other apparatus which is not registered in the communication apparatus and which has been extracted by the extracting unit, together with the apparatus setting information registered in the communication apparatus, an information selecting unit that selects desired apparatus setting information out of the apparatus setting information of the other apparatus which is not registered in the communication apparatus and the apparatus setting information registered in the communication apparatus, which are displayed by the display unit, and a setting unit that performs apparatus setting corresponding to the selected apparatus setting information.

Preferably, the communication apparatus comprises a registration selecting unit that selects whether or not the extracted apparatus setting information of the other apparatus which is not registered in the communication apparatus is to be registered as apparatus setting information of the communication apparatus.

Preferably, the communication apparatus comprises a data transmitting unit that transmits data to a desired transmission destination via the communication line, and wherein the apparatus setting information is for setting the transmission destination.

More preferably, the apparatus setting information is information selected from the group consisting of a facsimile number of the transmission destination, an e-mail address of the transmission destination, a folder of the transmission destination, and a box of the transmission destination.

To attain the above object, in a third aspect of the invention, there is provided an apparatus setting method of performing apparatus setting for an apparatus which is capable of registering apparatus setting information for performing setting of at least one of functions or operations thereof, comprising an acquiring step of obtaining apparatus setting information registered in at least one other apparatus connected to the apparatus via a communication line, from the other apparatus, an extracting step of extracting apparatus setting information of the other apparatus which is not registered in the apparatus out of the apparatus setting information of the other apparatus obtained in the acquiring step, a display step of displaying on a display the apparatus setting information of the other apparatus which is not registered in the apparatus and which has been extracted in the extracting step, together with apparatus setting information registered in the apparatus, an information selecting step of selecting desired apparatus setting information from the apparatus setting information of the other apparatus which is not registered in the apparatus and the apparatus setting information registered in the apparatus, which are displayed in the display step, and a setting step of performing setting of function or operation corresponding to the selected apparatus setting information.

To attain the above object, in a fourth aspect of the invention, there is provided a program executed by an apparatus which is capable of registering apparatus setting information for performing setting of at least one of functions or operations thereof, comprising an acquiring module for obtaining apparatus setting information registered in at least one other apparatus connected to the apparatus via a communication line, from the other apparatus, an extracting module for extracting apparatus setting information of the other apparatus which is not registered in the apparatus out of the apparatus setting information of the other apparatus obtained by the acquiring module, a display module for displaying on a display the apparatus setting information of the other apparatus which is not registered in the apparatus and which has been extracted by the extracting module, together with apparatus setting information registered in the apparatus, an information selecting module for selecting desired apparatus setting information from the apparatus setting information of the other apparatus which is not registered in the apparatus and the apparatus setting information registered in the apparatus, which are displayed by the display module, and a setting module for performing setting of function or operation corresponding to the selected apparatus setting information.

To attain the above object, in a fifth aspect of the invention, there is provided a computer-readable storage medium storing the program as claimed in claim 10.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof. It should be noted that the arrangement of the components and the numerical expressions and numerical values set forth in these embodiments do not limit the scope of the present invention unless it is specifically stated otherwise.

Figure 1:
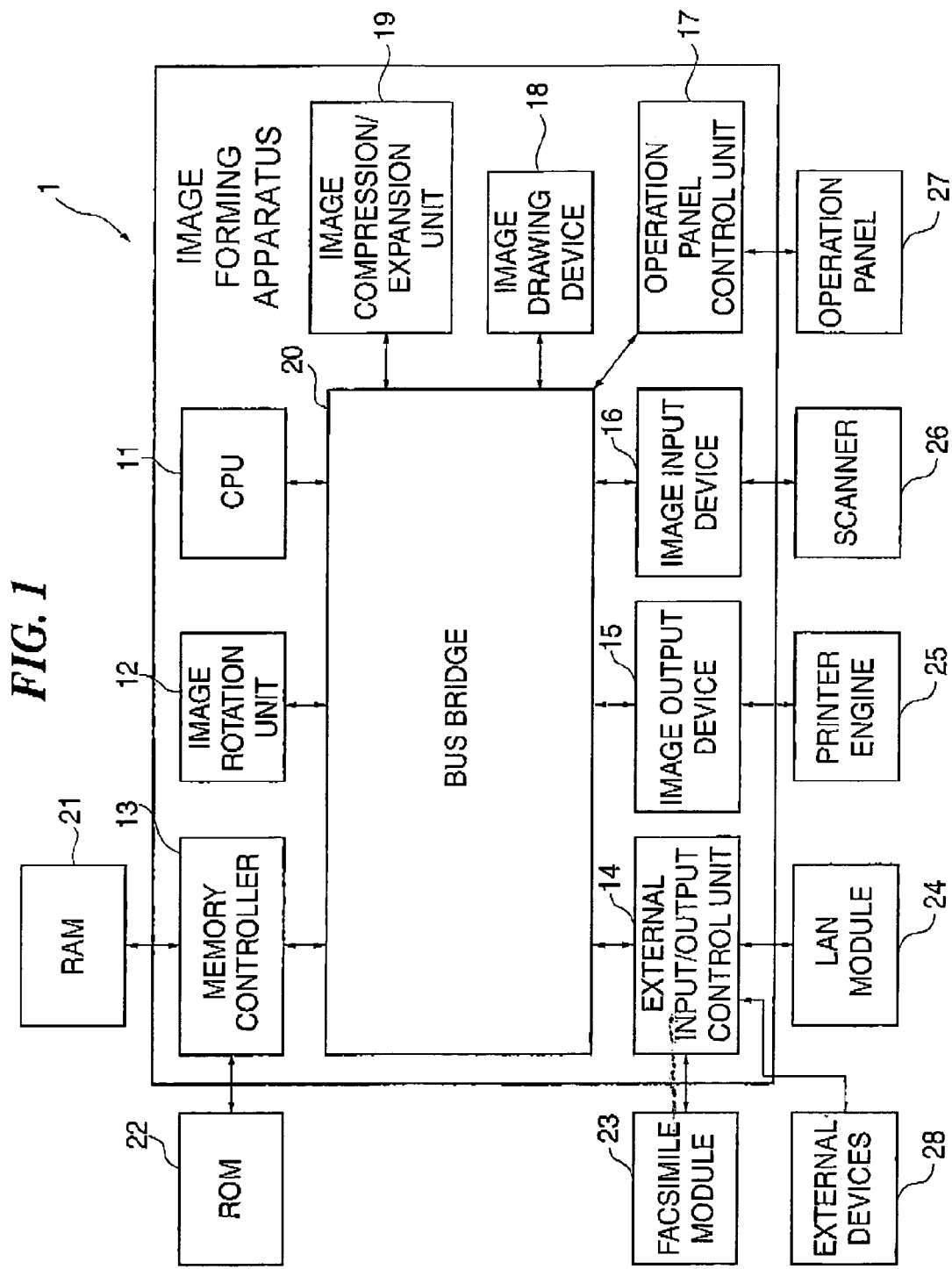
FIG. 1 is a block diagram schematically showing the configuration of an image forming apparatus according to a first embodiment of the present invention.
Figure 2:
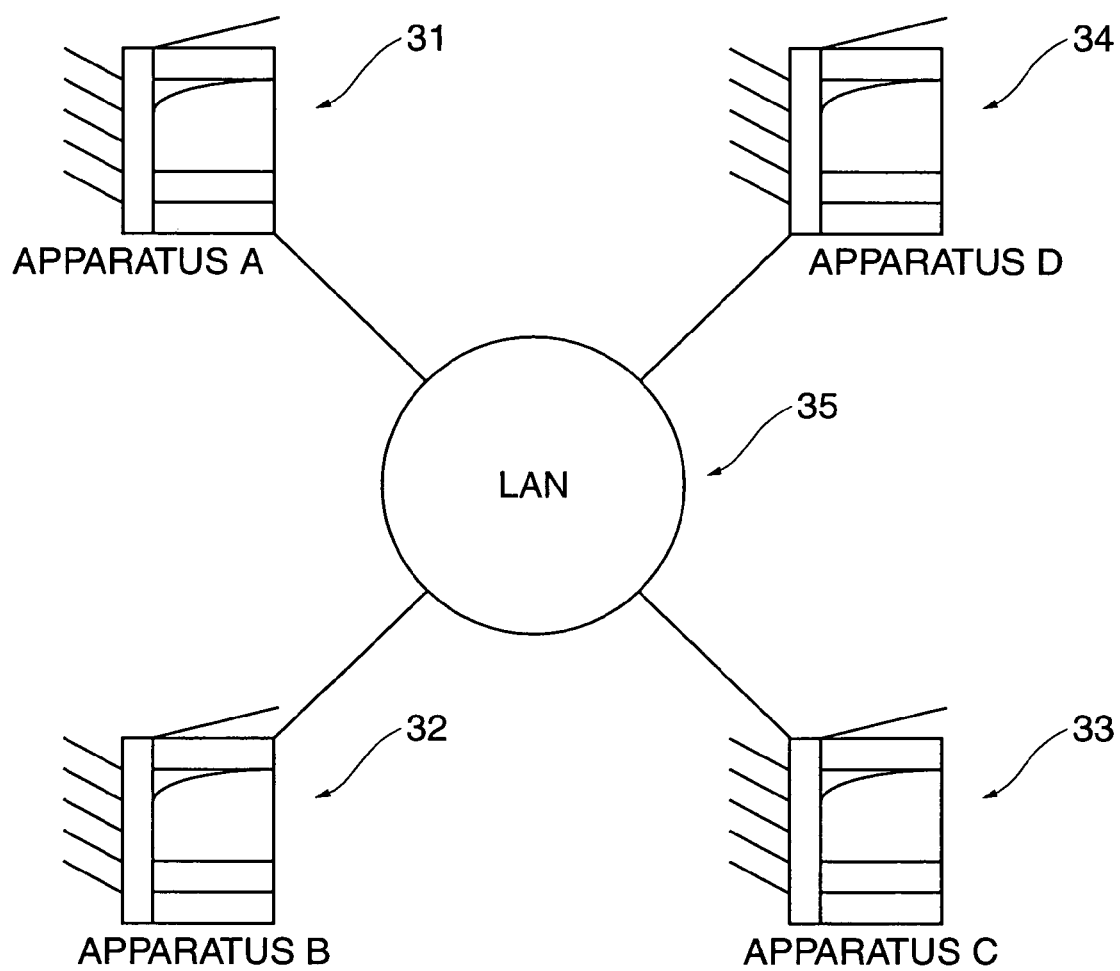
FIG. 2 is a view showing an example of manner of use of the image forming apparatus appearing in FIG. 1.

FIG. 1 is a block diagram schematically showing a configuration of an image forming apparatus according to a first embodiment of the present invention, and FIG. 2 is a view showing an example of manner of use of the image forming apparatus appearing in FIG. 1.

The image forming apparatus 1 according to the present embodiment is implemented by a digital multi-function machine which has a plurality of functions, and is provided with a CPU 11 for executing individual processing for performing respective functions while controlling the overall operation of the image forming apparatus 1, as shown in FIG. 1. The plurality of functions include a facsimile function, a printer function, and a copy function. Connected to the CPU 11 via a bus bridge 20 are an image rotation unit 12, a memory controller 13, an external input/output control unit 14, an image output device 15, an image input device 16, an operating panel control unit 17, an image drawing device 18, and an image compression/expansion unit 19.

The image rotation unit 12 rotates a 64-bit×64-bit image. The memory controller 13 controls reading and writing of data from and into a RAM 21, which is used as a receiving buffer for printing data, a work area for the CPU 11, and a memory for loading drawing data, and a ROM 22 which stores control programs and font data for the digital multi-function machine 1.

The external input/output control unit 14 has a USB interface, an IEEE 1284 interface, a PCI interface, and so forth for connecting external devices 28 including a host computer. In the present embodiment, the external devices 28 including a host computer and a HDD (hard disk drive unit) are connected to the external input/output control unit 14 via the USB interface. Also, a facsimile module 23 and a LAN module 24 are connected to the external input/output control unit 14 via the PCI interface. The facsimile module 23 is connected to a telephone line for performing facsimile communication. The LAN module 24 is connected to a LAN (Local Area Network) for communication with apparatuses on the LAN.

The image output device 15 outputs the drawing data stored in the RAM 21 to a printer engine 25. The printer engine 25 prints an image on a sheet based on the drawing data. The image input device 16 stores image data input from a scanner 26 in the RAM 21.

The operating panel control unit 17 controls the operating panel 27 constituting a user interface. The operating panel 27 is provided with a liquid crystal display with a touch panel and a plurality of hardkeys, for performing various inputs and displaying set information.

The image drawing device 18 interprets intermediate data converted by the CPU 11 from print data inputted from the external input/output control unit 14, and converts the intermediate data into drawing data. The image compression/expansion unit 19 compresses or expands the drawing data temporarily for saving a memory capacity. The bus bridge 20 has a function of mediating access to each block connected thereto.

The image forming apparatus 1 requests transmission of apparatus setting information corresponding to the presently operating mode to one or more other apparatuses which are connected via the LAN to the LAN module 24, and performs control for receiving the apparatus setting information transmitted from the one or more other apparatuses in response to the request. When the apparatus setting information transmitted from the one or more other apparatuses in response to the request is received, the received apparatus setting information is compared with apparatus setting information registered in the image forming apparatus 1, and only apparatus setting information which is not registered in the image forming apparatus 1 is extracted from the apparatus setting information received from the one or more other apparatuses. The extracted apparatus setting information which is not registered in the image forming apparatus 1 but in the other apparatus(es) is temporarily stored in the RAM 21, so as to regard the apparatus setting information as the apparatus setting information of the image forming apparatus 1. Here, the apparatus setting information of the image forming apparatus 1 is also stored in the RAM 21 when the image forming apparatus 1 is operated. The extracted apparatus setting information which is not registered in the image forming apparatus 1 but in the other apparatus(es) is displayed on the operating panel 27 together with the apparatus setting information of the image forming apparatus 1. A user can select desired apparatus setting information out of the apparatus setting information of the other apparatus(es) which is not registered in the image forming apparatus 1 and the apparatus setting information of the image forming apparatus 1, displayed on the operating panel 27. When apparatus setting information is selected by the user, the selected apparatus setting information is read from the RAM 21, and a setting corresponding to the read apparatus setting information is performed for the image forming apparatus 1.

The image forming apparatus 1 constructed above is used in a manner shown in FIG. 2, for example. Each of apparatuses A31, B32, C33, and D34 shown in FIG. 2 is an image forming apparatus that has the same configuration as the above-described image forming apparatus 1, and these apparatuses are connected to the LAN 35.

Figure 3:
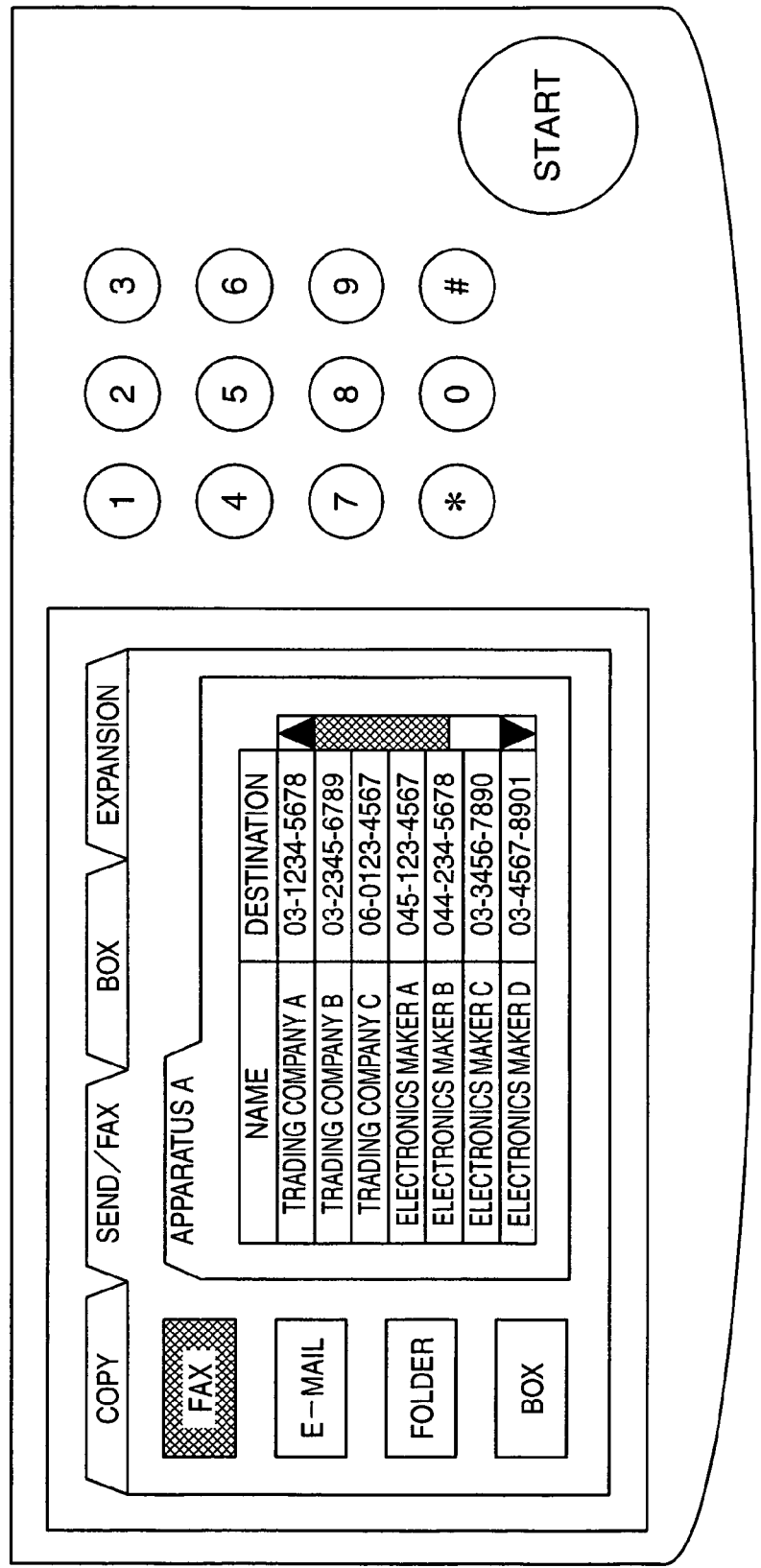
FIG. 3 is a view showing an example of a screen displayed on an operating panel 27A of an apparatus A31 appearing in FIG. 2 (corresponding to an operating panel 27 appearing in FIG. 1) and showing a list of apparatus setting information of the apparatus A31.
Figure 4:
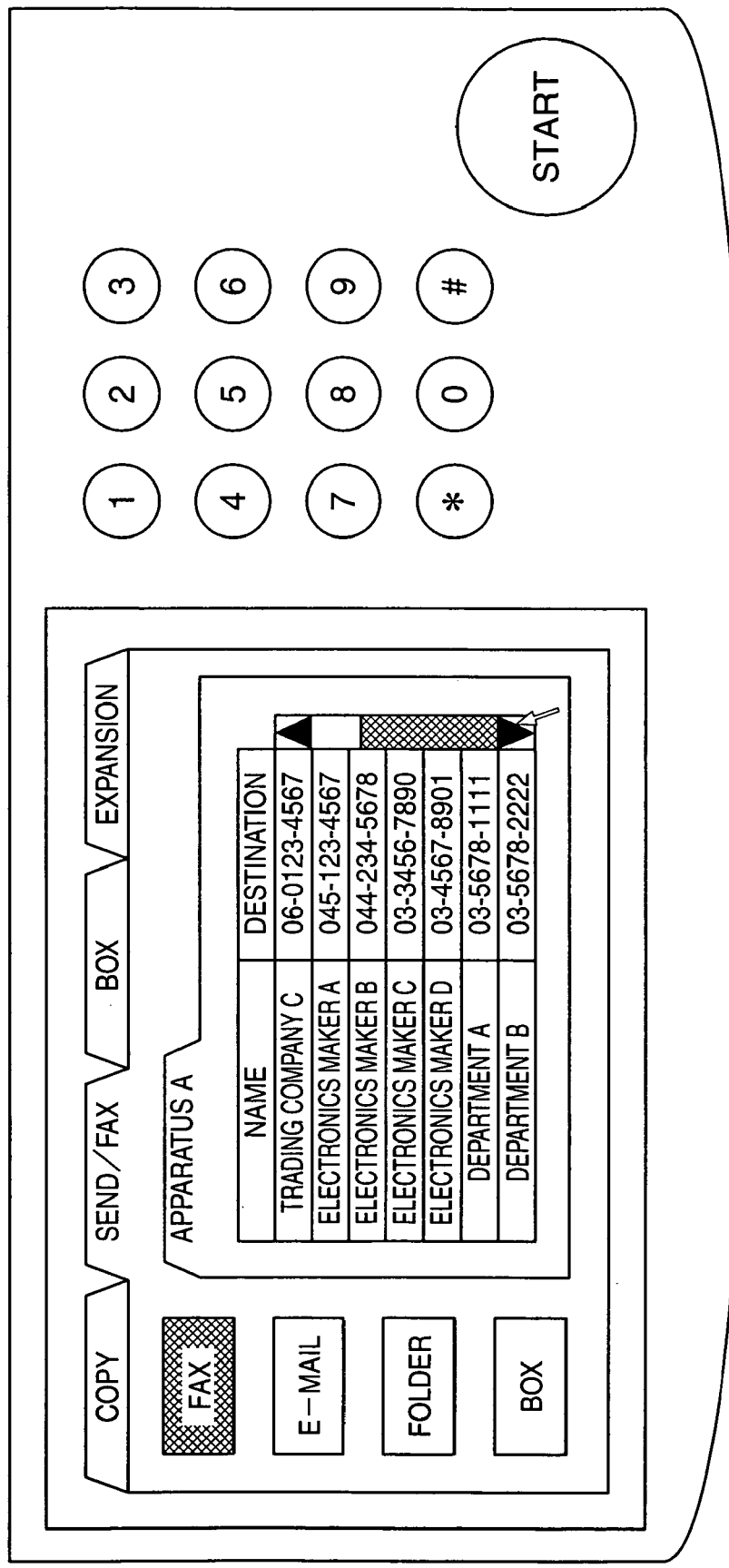
FIG. 4 is a view showing an example of a screen in which other apparatus setting information is displayed by scrolling the screen of FIG. 3.

Next, on the operating panel 27A (corresponding to the operating panel 27 appearing in FIG. 1) of the apparatus A31, examples of a screen which displays the apparatus setting information of the other apparatuses which is not registered in the apparatus A31 and the apparatus setting information of the apparatus A31 will be described with reference to FIGS. 3 and 4. FIG. 3 is a view showing an example of a screen displayed on the operating panel 27A of the apparatus A31 appearing in FIG. 2 and showing a list of the apparatus setting information of the apparatus A31, and FIG. 4 is a view showing an example of a screen in which other apparatus setting information is displayed by scrolling the screen of FIG. 3.

Assuming that a facsimile mode "SEND/FAX" is selected on the operating panel 27A of the apparatus A31, a list of facsimile destination information registered in the apparatus A31 is displayed as shown in FIG. 3. Here, if facsimile destination information of other apparatus(es) (the facsimile destination information of the other apparatus(es) which is not registered in the apparatus A31) has been obtained, a list of facsimile destination information of the other apparatus (es) will be displayed together with the facsimile destination information of the apparatus A31. The screen example shown in FIG. 3 is an example in which only the list of the facsimile destination information registered in the apparatus A31 is displayed. In this example, it is assumed that trading companies A to C, electronics makers A to E, and departments A and B are registered in the apparatus A31 in advance as facsimile destination information. Similarly, it is assumed that a substrate maker A, trading companies A and B, electronics makers A to C, and departments A to D are registered in the apparatus B32, a substrate maker B, trading companies B to D, electronics makers B, D, and F, and departments B to D are registered in the apparatus C33, and substrate makers A to C, trading companies A, C, and E, electronics makers A, C, and E, and departments A, C, and E are registered in the apparatus D34.

In the screen example of FIG. 3, in which the maximum number of destination addresses that can be displayed at a time is seven, other destination addresses registered in the apparatus A31 can be displayed by operating an up-and-down scroll key. In the screen state shown in FIG. 3, when the scroll key is operated, other destination addresses are displayed, as shown in FIG. 4.

Figure 5:
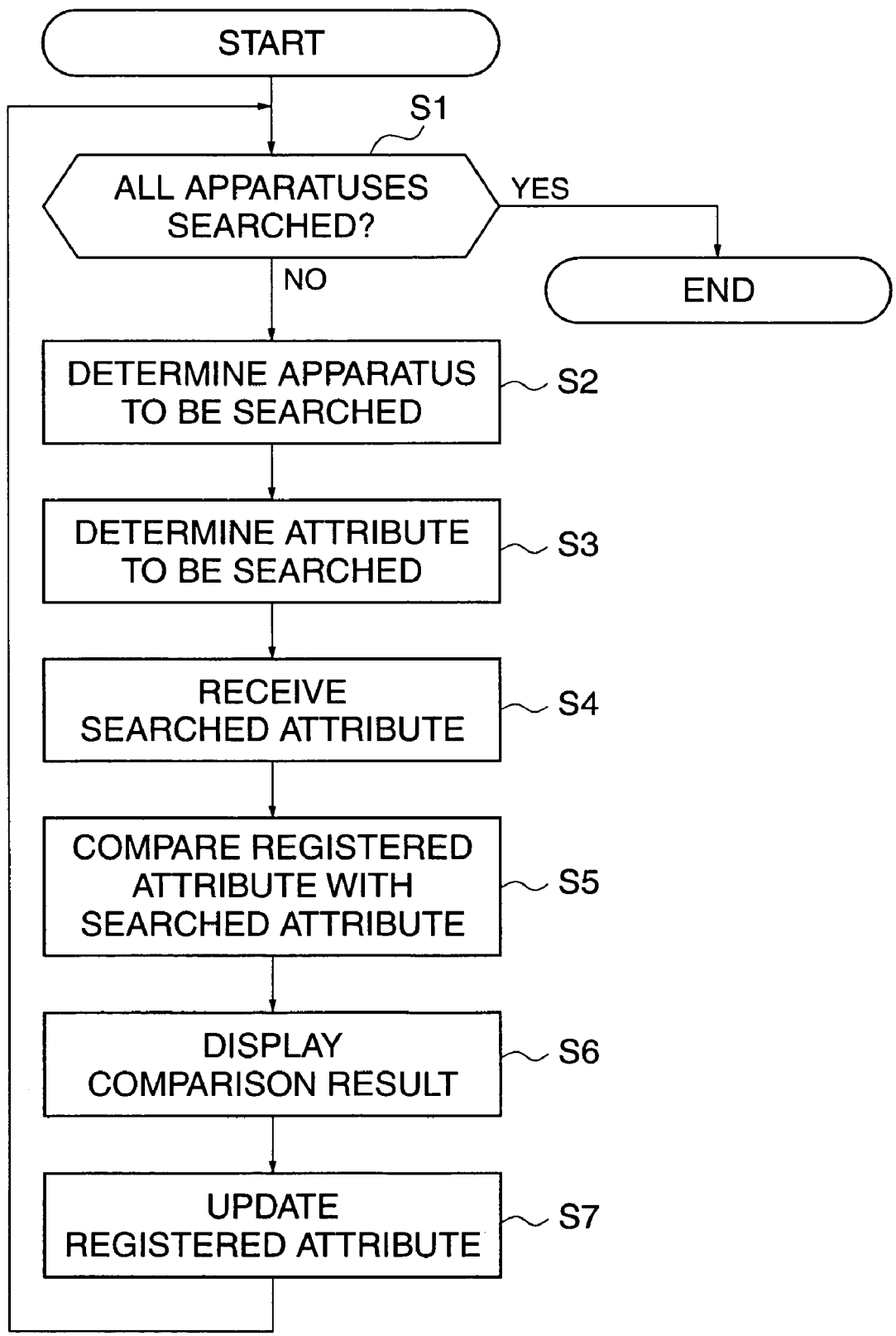
FIG. 5 is a flow chart showing the procedure of a process for acquiring apparatus setting information of other apparatuses, executed by the apparatus A31 (the image forming apparatus of FIG. 1) appearing in FIG. 2.
Figure 6:
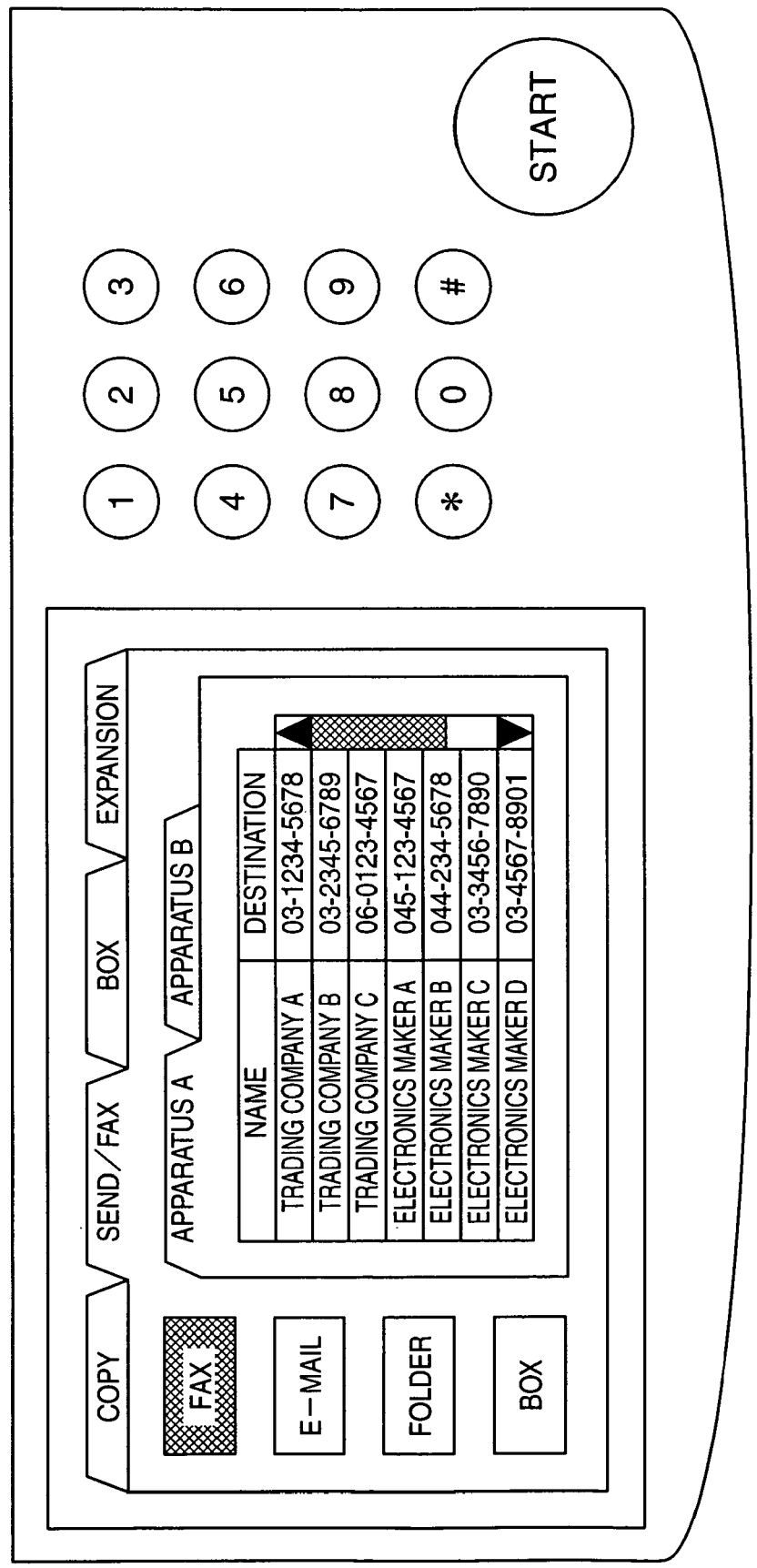
FIG. 6 is a view showing an example of a screen in which facsimile destination information of an apparatus B32 (facsimile destination information of the apparatus B32 which is not registered in the apparatus A31) is additionally displayed as alternatives on the operating panel 27 of the apparatus A31.
Figure 7:
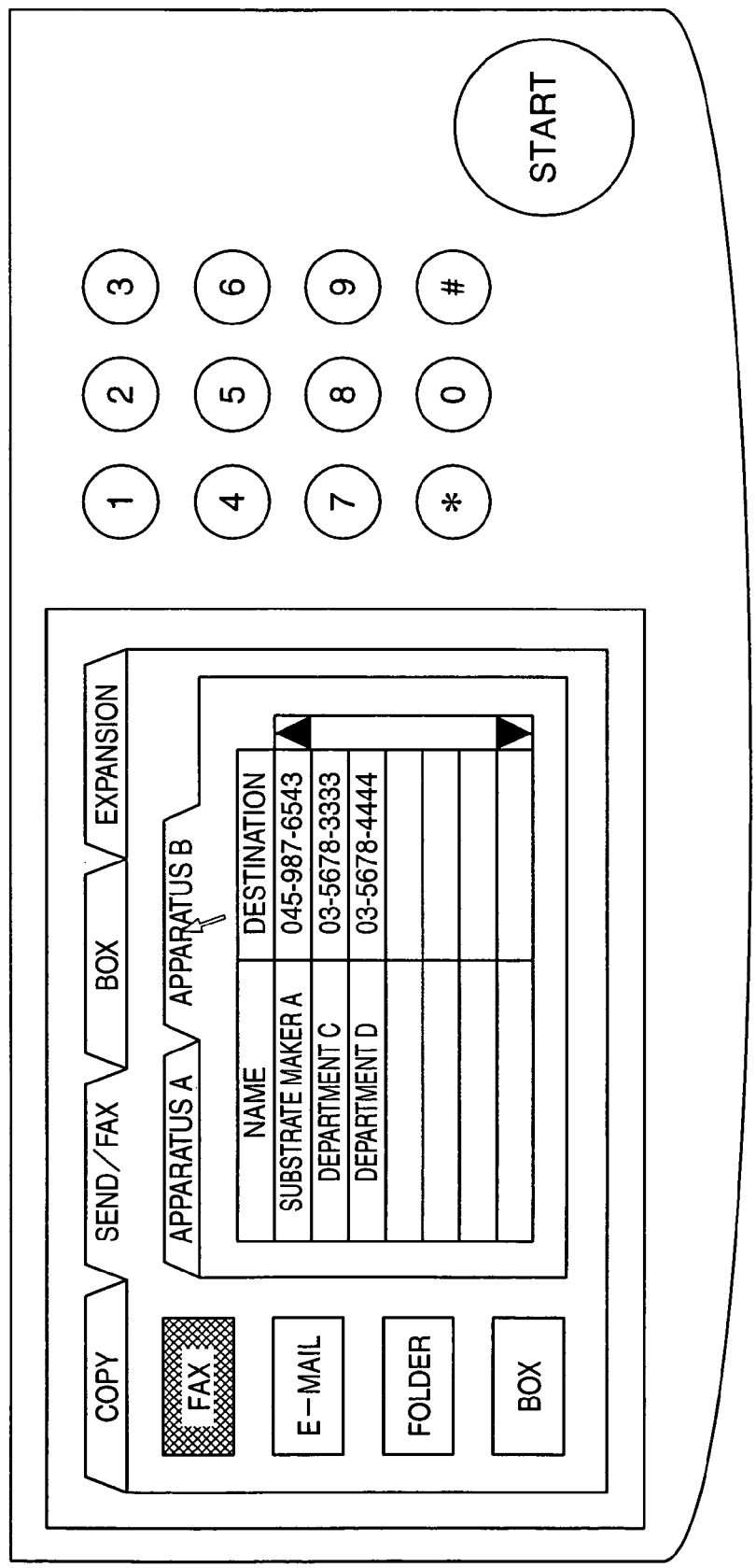
FIG. 7 is a view showing an example of a screen in which a list of the facsimile destination information of the apparatus B32 (facsimile destination information of the apparatus B32 which is not registered in the apparatus A31) is displayed on the operating panel 27A of the apparatus A31.
Figure 8:
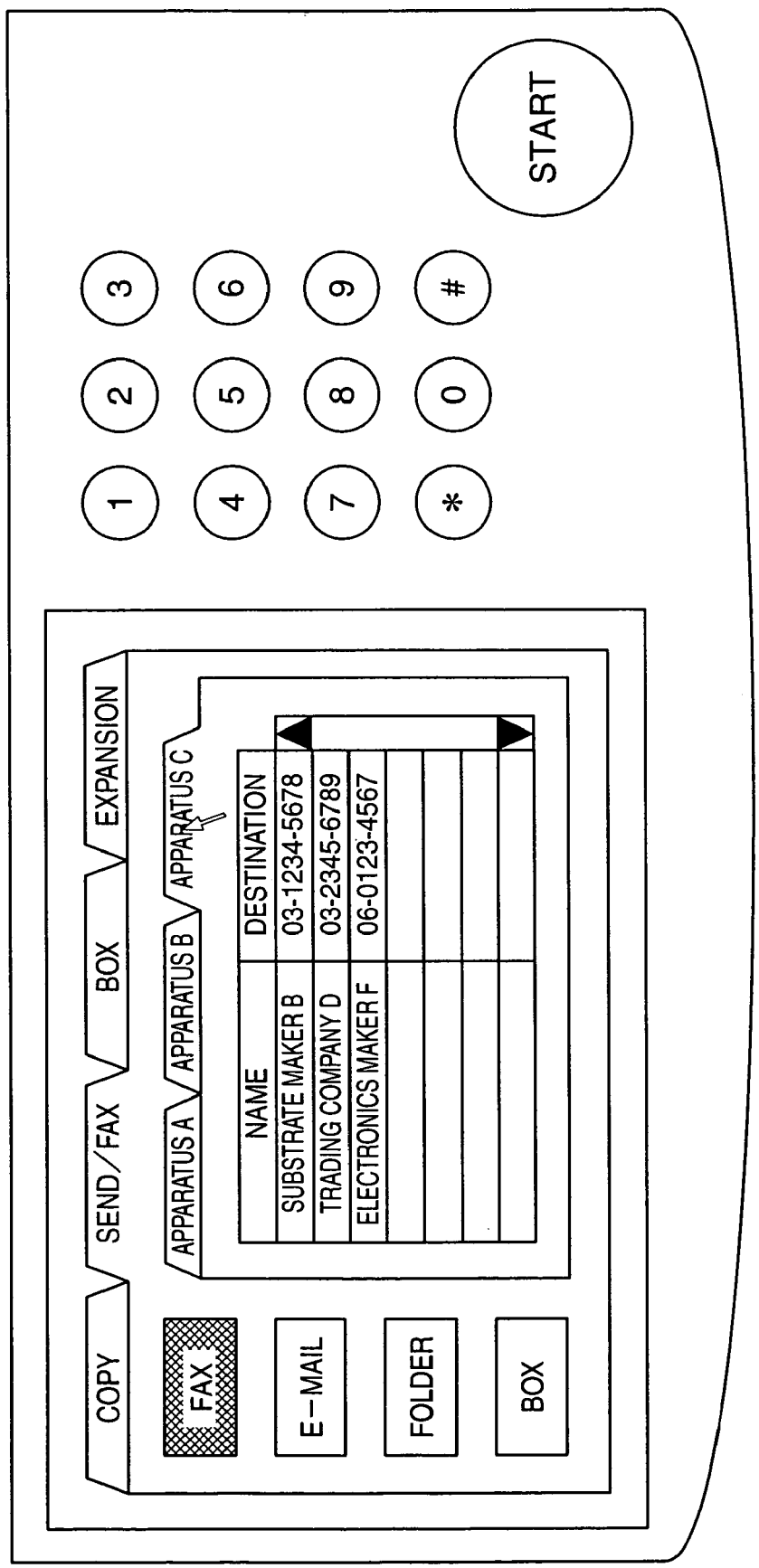
FIG. 8 is a view showing an example of a screen in which a list of facsimile destination information of an apparatus C33 (facsimile destination information of the apparatus C33 which is not registered in the apparatuses A31 and B32) is displayed on the operating panel 27A of the apparatus A31.
Figure 9:
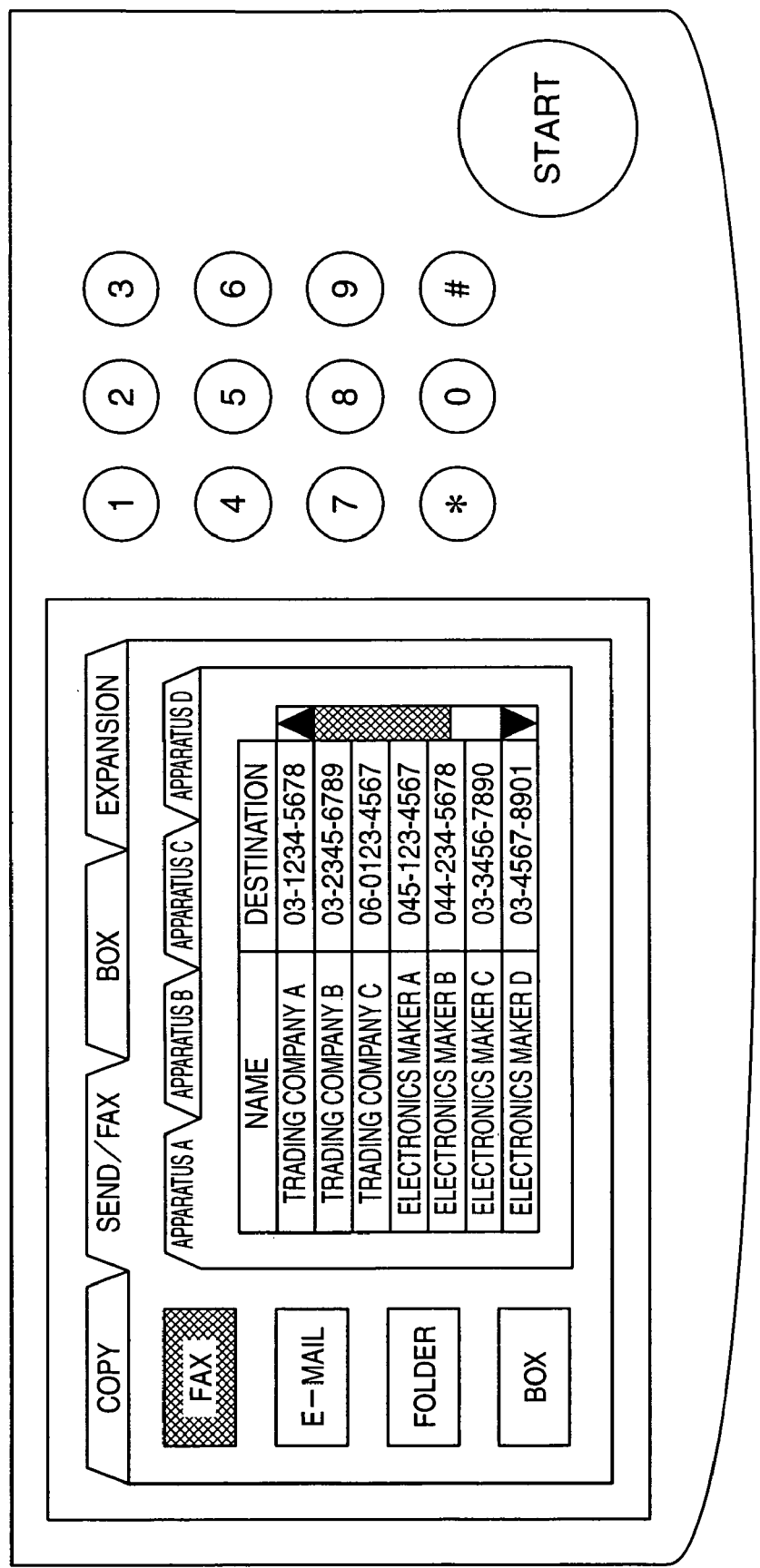
FIG. 9 is a view showing an example of a screen in which a list of facsimile destination information acquired by searching all apparatuses on a LAN 35 is displayed on the operating panel 27A of the apparatus A31.

While the screen of FIG. 3 is displayed, the apparatus A31 performs a process for acquiring apparatus setting information of other apparatuses in the background according to the procedure shown in the flow chart of FIG. 5. The operation of carrying out this process will be described as follows with reference to FIGS. 5 to 9. FIG. 5 is a flow chart showing the procedure of the process for obtaining apparatus setting information of other apparatuses, which is executed by the apparatus A31 (the image forming apparatus 1 appearing in FIG. 1), FIG. 6 is a view showing an example of a screen in which the facsimile destination information of the apparatus B32 (the facsimile destination information of the apparatus B32 which is not registered in the apparatus A31) is additionally displayed as alternatives on the operating panel 27 of the apparatus A31, FIG. 7 is a view showing an example of a screen in which a list of the facsimile destination information of the apparatus B32 (the facsimile destination information of the apparatus B32 which is not registered in the apparatus A31) is displayed on the operating panel 27A of the apparatus A31, FIG. 8 is a view showing an example of a screen in which a list of facsimile destination information of the apparatus C33 (facsimile destination information of the apparatus C33 which is registered neither in the apparatus A31 nor in the apparatus B32) is displayed on the operating panel 27A of the apparatus A31, and FIG. 9 is a view showing an example of a screen in which a list of facsimile destination information acquired by searching the apparatuses on the LAN 35 is displayed on the operating panel 27A of the apparatus A31. The procedure shown in the flow chart of FIG. 5 is executed by a CPU of the apparatus A31 (the CPU 11 appearing in FIG. 1) according to a program stored in a ROM (the ROM 22 appearing in FIG. 1).

When the facsimile mode "SEND/FAX" is selected on the operating panel 27A of the apparatus A31, the apparatus A31 determines whether or not all the apparatuses on the LAN 35 have been searched in a step S1, as shown in FIG. 5. Here, since in the first loop of execution of the program, no search has been performed yet, the apparatus A31 determines which apparatus is to be searched in a step S2. Here, it is assumed the apparatus B32 is determined to be searched first. Then, in a step S3, the apparatus A31 determines an attribute to be searched. Here, since the attribute under present operation with the apparatus A31 is facsimile destination information, the attribute to be searched is determined as facsimile destination information.

Next, in a step S4, the apparatus A31 requests the apparatus B32 to transmit facsimile destination information, and receives a list of the facsimile destination information (searched attribute) returned from the apparatus B32 in response to the request. The received list of the facsimile destination information of the apparatus B32 is temporarily stored in the RAM 21. The facsimile destination information of the apparatus A31 is stored in the HDD (the HDD 28 appearing in FIG. 1) of the apparatus A31, and, when the facsimile mode is selected, the facsimile destination information is read from the above-mentioned HDD and is temporarily stored in the RAM 21. Then, in a step S5, the apparatus A31 compares the list of the facsimile destination information registered in the apparatus A31 (registered attribute) with the list of the facsimile destination information of the apparatus B32 (searched attribute). In a step S6, the apparatus A31 extracts facsimile destination information which is not registered in the apparatus A31 out of the list of the facsimile destination information of the apparatus B32 according to the comparison result, and then displays the list of the extracted facsimile destination information of the apparatus B32 which is not registered in the apparatus A31 on the operating panel 27A, together with the list of the facsimile destination information of the apparatus A31. Here, as shown in FIG. 6 for example, the list of the facsimile destination information of the apparatus A31 is displayed on the operating panel 27A of the apparatus A31, but the list of the facsimile destination information of the apparatus B32 which is not registered in the apparatus A31 is additionally displayed as alternatives. Here, if the screen displayed on the operating panel 27A is changed to the display screen of the list of the facsimile destination information of the apparatus B32, the list of the facsimile destination information of the apparatus B32 which is not registered in the apparatus A31 is displayed as shown in FIG. 7.

Then, in a step S7, the apparatus A31 temporarily stores the extracted facsimile destination information of the apparatus B32 which is not registered in the apparatus A31 together with the facsimile destination information of the apparatus A31 in the RAM 21 as registered facsimile destination information (registered attribute). Then, the process returns to the above step S1 and the apparatus A31 searches the subsequent apparatuses, that is, the apparatuses C33 and D34 in a similar way to the case of the apparatus B32. If search of all the apparatuses on the LAN 35 is completed, the process is terminated.

Here, in the search of the apparatus C33, the facsimile destination information of the apparatus B32 which is not registered in the apparatus A31 and the facsimile destination information of the apparatus A31 are assumed as registered facsimile destination information, the registered facsimile destination information and the facsimile destination information of the apparatus C33 are compared with each other, and only facsimile destination information which is not included in the registered facsimile destination information is extracted out of the facsimile destination information of the apparatus C33. As shown in FIG. 8, the extracted facsimile destination information is additionally displayed on the operating panel 27A so that the extracted information can be selected as the facsimile destination information of the apparatus A31. The extracted facsimile destination information of the apparatus C33 which is not included in the registered facsimile destination information is incorporated into the above-mentioned registered facsimile destination information, and is temporarily stored in the RAM 21 as registered facsimile destination information. Also in the search of the apparatus D34, only facsimile destination information which is not included in the registered facsimile destination information (destination addresses registered in the apparatuses A31, B32, and C33) is extracted out of the facsimile destination information of the apparatus D34 in a similar way, and is temporarily stored in the RAM 21 as registered facsimile destination information.

Thus, when the search of all the apparatuses on the LAN 35 is completed, the list of all the facsimile destination information registered in the four apparatuses of A31 to D34 (the items of the facsimile destination information are different from each other) is displayed on the operating panel 27A of the apparatus 31A, as shown in FIG. 9.

If desired facsimile destination information is selected from the list of the facsimile destination information displayed on the operating panel 27A by a user, the facsimile destination information (facsimile number) selected by the user is set, and facsimile transmission is performed to the destination of the facsimile number or destination address indicated by the set facsimile destination information. When the facsimile mode is terminated with completion of the facsimile transmission, the registered facsimile destination information temporarily stored in the RAM 21 is erased. Thereafter, if the facsimile mode "SEND/FAX" is selected again, the above-described process is executed in a similar way and desired facsimile destination information can be selected in the apparatus A31 from all the facsimile destination information registered in the four apparatuses of A31 to D34.

The process described above is not executed in accordance with a user's instruction but is automatically executed in the apparatus A31 when the facsimile mode "SEND/FAX" is selected. Whenever information is obtained from any of the other apparatuses, the obtained information is added to a screen displayed on the operating panel 27A as alternatives. Therefore, the user need not take the trouble of setting destinations. Further, since the facsimile destination information registered in the other apparatuses on the LAN 35 can be used from the apparatus A31, it is not necessary to register the facsimile destination information of the other apparatuses in the apparatus A31. As a result, the apparatus A31 can give the user the same operating environment as one in which all facsimile destination information registered in all the apparatuses is registered. That is, userfriendliness of all the apparatuses can be made at the same level, without performing the same setting for all the apparatuses.

Although in the present embodiment, the case of facsimile destination information is used as apparatus setting information, apparatus setting information such as e-mail addresses of transmission destinations, folders of transmission destinations, and boxes of transmission destinations, for example, which are registered in the other apparatuses, can be used from the apparatus A31 in a similar way.

Although in the present embodiment, when the facsimile mode "SEND/FAX" is selected, search is performed so that the facsimile destination information of other apparatuses is obtained, alternatively, for example, when the power of the apparatus A31 is turned on, search may be performed so that the facsimile destination information of the other apparatuses is obtained. In this case, however, if update of the facsimile destination information is performed in other apparatus(es) after the searching of the other apparatus(es), the updated facsimile destination information of the other apparatus(es) cannot be used until the power of the apparatus A31 is turned on again.

Further, although in the present embodiment, the apparatus setting information registered in the other apparatuses on the LAN 35 is used from the apparatus A31, the apparatus setting information registered in the other apparatuses on the LAN 35 can be used from any of the apparatus B32, apparatus C33, and apparatus D34, which have the same configuration as the image forming apparatus 1 of FIG. 1, in a similar way to the case of the apparatus A31.

Next, a second embodiment of the present invention will be described with reference to FIGS. 10 to 14.

Figure 10:
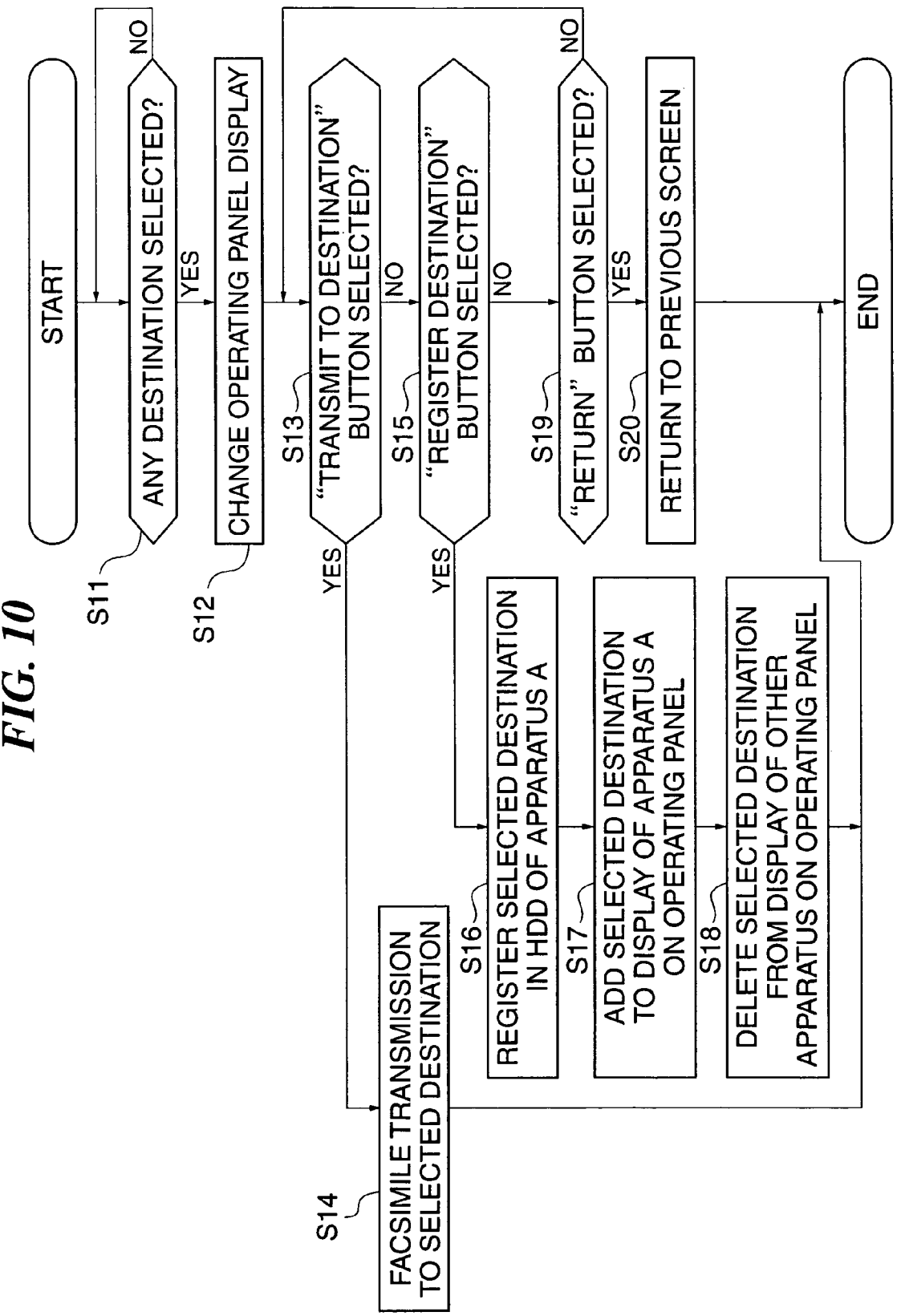
FIG. 10 is a flow chart showing the procedure of a process for registering apparatus setting information of the other apparatuses in an apparatus A31, executed by an image forming apparatus according to a second embodiment of the present invention.
Figure 11:
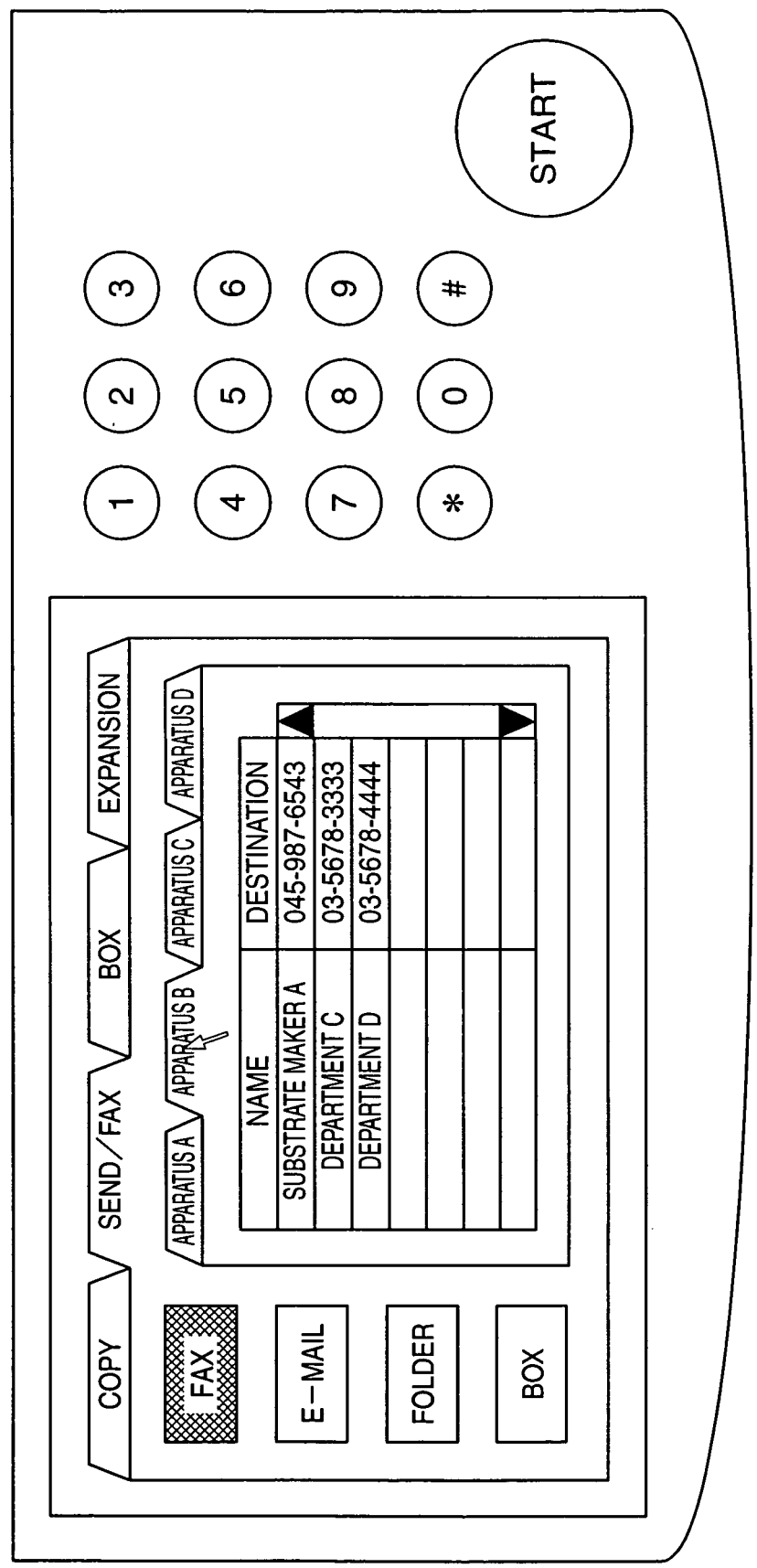
FIG. 11 is a view showing an example of a screen in which a list of facsimile destination information of the apparatus B32 (facsimile destination information of the apparatus B32 which is not registered in the apparatus A31) is displayed on the operating panel 27A of the apparatus A31.
Figure 12:
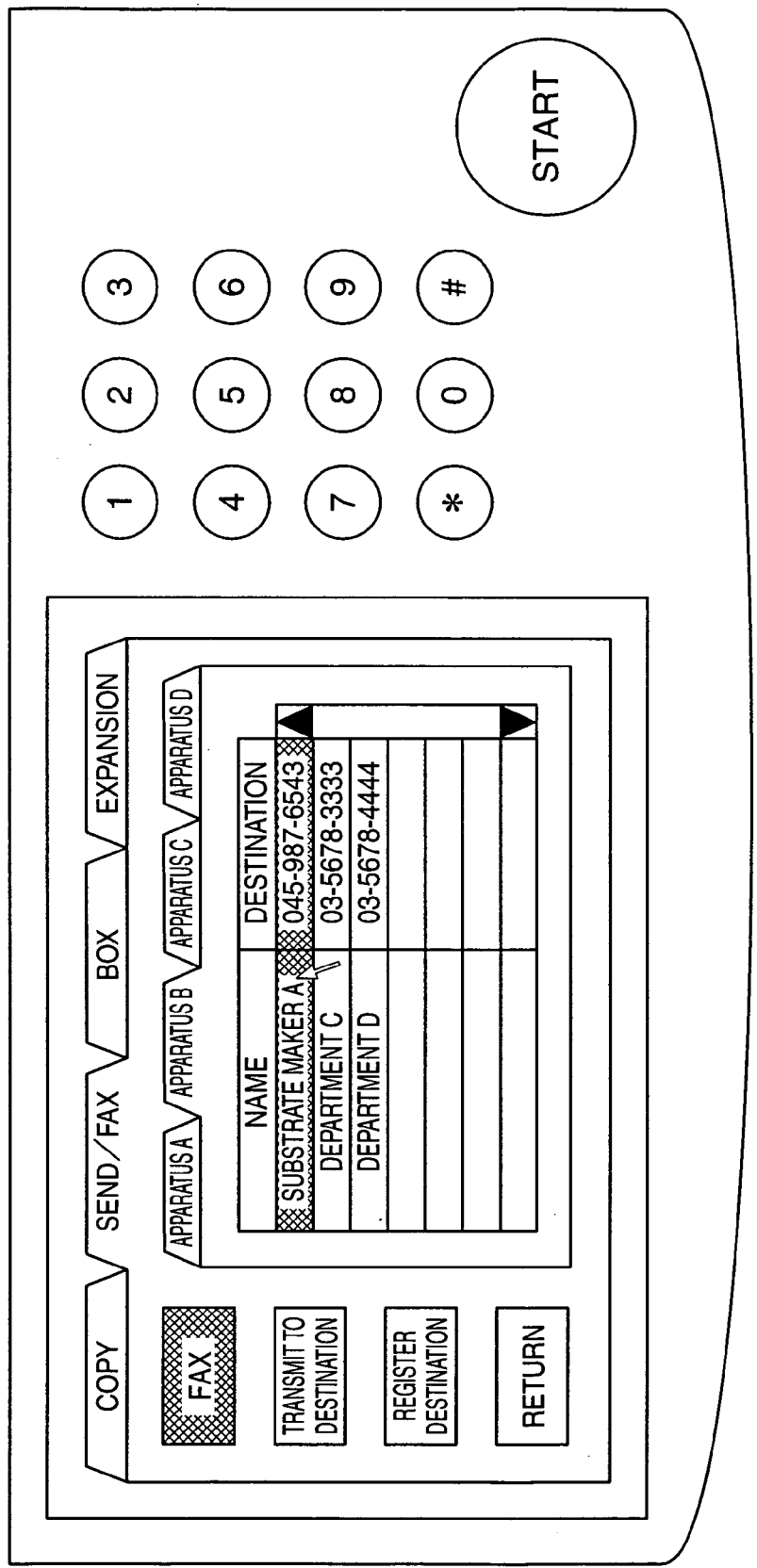
FIG. 12 is a view showing a screen displayed on the operating panel 27A in which a piece of facsimile destination information to be registered in the apparatus A31 has been selected from the list of the facsimile destination information of the apparatus B32.
Figure 13:
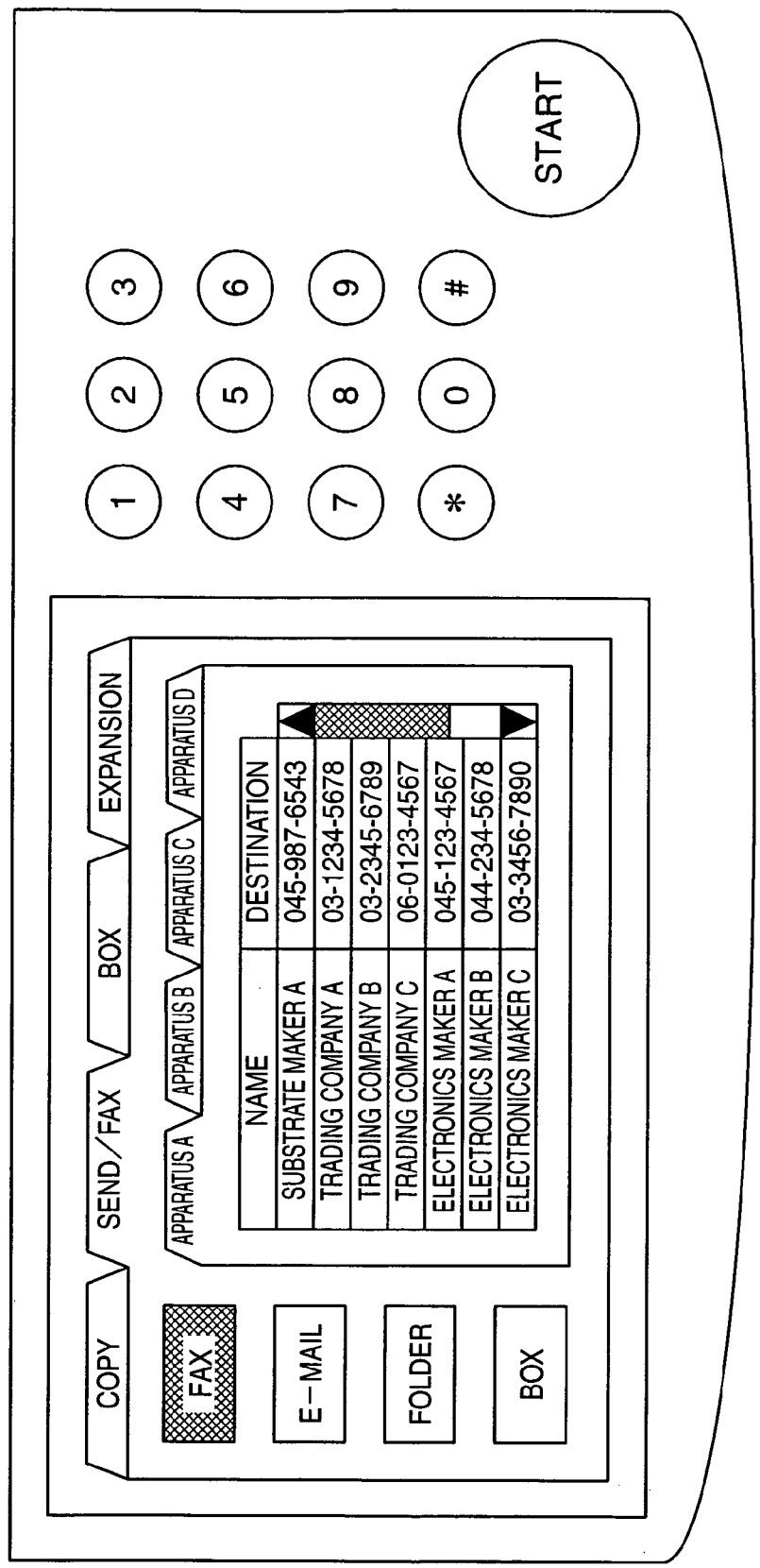
FIG. 13 is a view showing an example of a screen showing a list of facsimile destination information of the apparatus A31 into which the selected facsimile destination information of the apparatus B32 has been incorporated.
Figure 14:
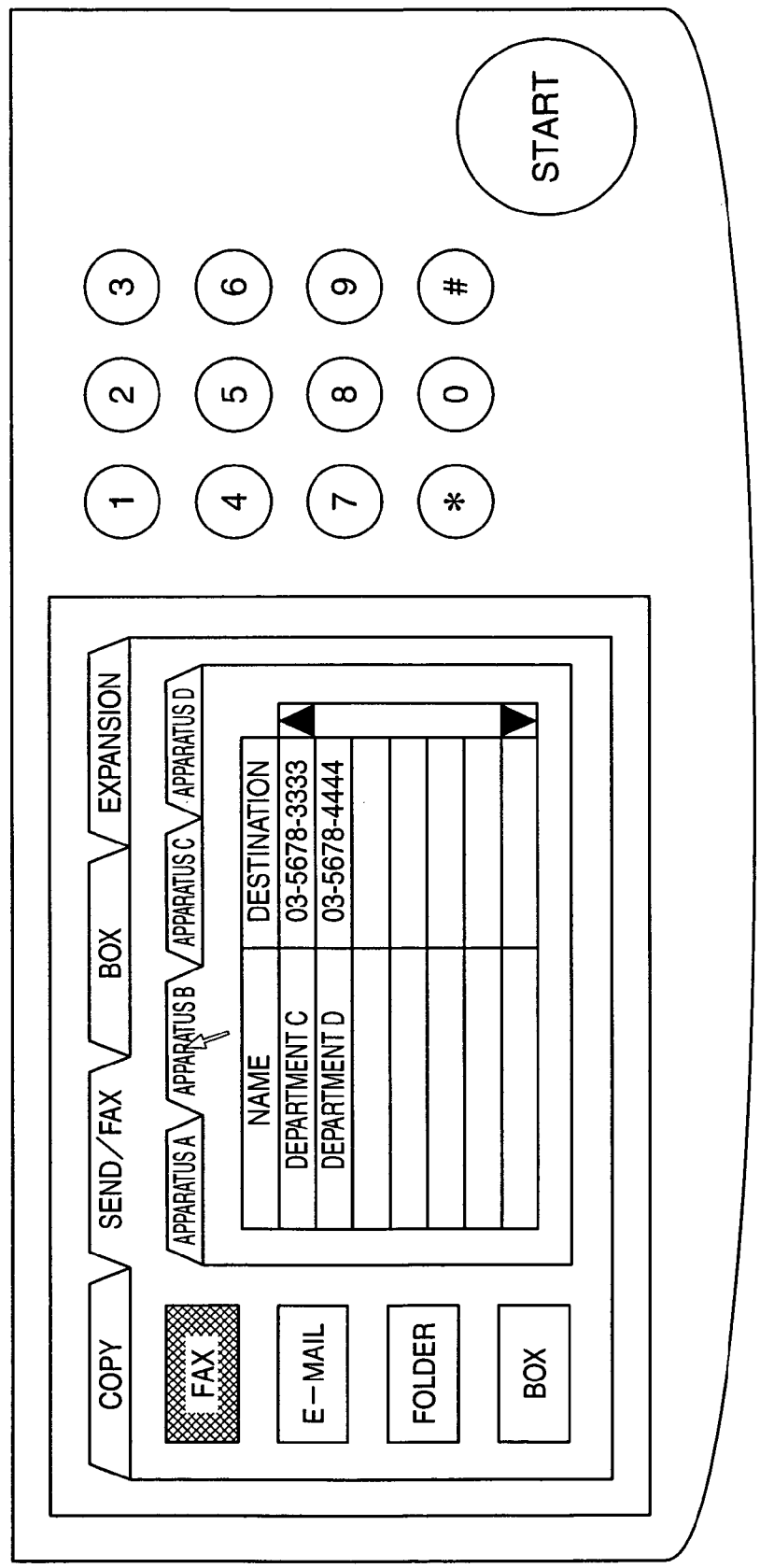
FIG. 14 is a view showing an example of a screen showing the list of the facsimile destination information of the apparatus B32 after the selected facsimile destination information of the apparatus B32 has been incorporated into the facsimile destination information of the apparatus A31.

FIG. 10 is a flow chart showing the procedure of a process for registering apparatus setting information of other apparatuses in the apparatus A31 performed by an image forming apparatus according to the second embodiment of the present invention, FIG. 11 is a view showing an example of a screen in which a list of facsimile destination information of the apparatus B32 (the facsimile destination information of the apparatus B32 which is not registered in the apparatus A31) is displayed on the operating panel 27A of the apparatus A31, FIG. 12 is a view showing a screen displayed on the operating panel 27A in which a piece of facsimile destination information to be registered in the apparatus A31 has been selected from the list of the facsimile destination information of the apparatus B32, FIG. 13 is a view showing an example of a screen showing a list of the facsimile destination information of the apparatus A31 into which the selected facsimile destination information of the apparatus B32 has been incorporated, and FIG. 14 is a view showing an example of a screen showing the list of the facsimile destination information of the apparatus B32 after the selected facsimile destination information of the apparatus B32 has been incorporated into the facsimile destination information of the apparatus A31.

The second embodiment is fundamentally the same in construction as the first embodiment described above, and therefore in the following description of the second embodiment, elements and parts corresponding to those in the first embodiment are designated by identical reference numerals.

In the first embodiment described above, facsimile destination information registered in the other apparatuses is searched each time the facsimile mode is selected, and the apparatus setting information of the other apparatuses is not registered in the apparatus A31. However, when the apparatus A31 is set to the facsimile mode, if any of the other apparatuses has not been started, that is, for example, if the power of any other apparatus has not been turned on, the apparatus A31 cannot use the facsimile destination information registered in the other apparatus.

Therefore, in the present embodiment, the apparatus A31 is provided with a registration function to register the apparatus setting information of other apparatuses. It is to be noted that the registration function is performed after the process of the first embodiment described above has been already performed and the facsimile destination information registered in the other apparatuses (the facsimile destination information of the other apparatuses which is not registered in the apparatus A31) has been stored in the RAM 21 of the apparatus A31.

The registration function will be described hereinafter with reference to FIGS. 10 to 14. Here, a description will be given of the case where the information on the substrate maker A that is already registered in the apparatus B32 is registered in the apparatus A31.

As shown in FIG. 10, in a step S1, the apparatus A31 waits for facsimile destination information of any other apparatus to be selected on the operating panel 27A. Here, it is assumed that the facsimile destination information of the substrate maker A of the apparatus B32 has been selected by a user on the screen of the operating panel 27A as shown in FIG. 11, for example. In response to the selection, in a step S12, the apparatus A31 changes the display on the operating panel 27A. For example, the display screen of the operating panel 27A is changed to a display screen shown in FIG. 12. In this case, the section of the selected substrate maker A is highlighted, and at the same time selection buttons on the left of the screen are switched so that a "TRANSMIT TO DESTINATION" button, a "REGISTER DESTINATION" button, and a "RETURN" button are displayed.

Next, in a step S13, the apparatus A31 determines whether or not the "TRANSMIT TO DESTINATION" button shown in FIG. 12 has been selected. Here, if the "TRANSMIT TO DESTINATION" button has been selected, the apparatus A31 performs facsimile transmission to the selected facsimile destination, in a step S14, and then the process is terminated.

When it is determined in the step S13 that the "TRANSMIT TO DESTINATION" button has not been selected, the apparatus A31 determines whether or not the "REGISTER DESTINATION" button has been selected, in a step S15. Here, if the "REGISTER DESTINATION" button has been selected, the apparatus A31 registers the selected facsimile destination information in the HDD of the apparatus A31 (corresponding to the HDD 28 in FIG. 1) in a step S16. Then, in a step S17, the apparatus A31 adds the selected facsimile destination information to the list of the facsimile destination information of the apparatus A31 displayed on the operating panel 27A thereof. Then in a step S18, the apparatus A31 deletes the selected facsimile destination information from the list of the facsimile destination information of the other apparatus that is currently displayed on the operating panel 27A thereof, and the process is terminated.

When it is determined in the step S15 that the "REGISTER DESTINATION" button has not been selected, the apparatus A31 determines whether or not the "RETURN" button has been selected, in a step S19. Here, when the "RETURN" button has been selected, the apparatus A31 causes the display to return to the immediately preceding screen (the display screen of FIG. 11), and the process is terminated. On the other hand, when the "RETURN" button has not been selected, the process returns to the step S13.

After the facsimile destination information of the substrate maker A registered in the apparatus B32 has been registered in the apparatus A31, the facsimile destination information of the substrate maker A is into the list of the facsimile destination information registered in the apparatus A31, which is then displayed as shown in FIG. 13. Then, as shown in FIG. 14, the facsimile destination information of the substrate maker A is deleted from the list of the facsimile destination information of the apparatus B32 to be displayed on the operating panel 27A.

When any other apparatus has not been started because the power has not turned on or for another cause, the apparatus setting information on the other apparatus cannot be recognized. However, according to the present embodiment, since apparatus setting information of the other apparatuses which is not registered in the apparatus A31 can be registered in the apparatus A31, userfriendliness can be improved.

It is to be noted that the present invention is not limited to the embodiments described above, but can be modified in various ways without departing from the scope of the invention.

For example, although the above-described embodiments are directed to an image forming apparatus as a digital multi-function machine having a plurality of functions, the present invention is not limited to this, but may be applied to communication apparatuses such as a facsimile machine and a personal computer having an electronic mail function.

It is to be understood that the object of the present invention may also accomplished by supplying a system or an apparatus with a storage medium in which a program code of software that realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above-described embodiments, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of either of the above described embodiments may be accomplished not only by executing the program code read out by a computer, but also by causing an OS (Operating System) or the like which operates on the computer to perform a part or all of the actual operations based on instructions of the program code.

Further, it is to be understood that the functions of either of the above described embodiments may be accomplished by writing the program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-262798 filed Sep. 9, 2004, which is hereby incorporated by reference herein.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus capable of registering apparatus setting information for performing setting of at least one of functions or operations thereof, comprising:

an acquiring unit that obtains apparatus setting information registered in at least one other apparatus connected to the image forming apparatus via a communication line, from the other apparatus;

an extracting unit that extracts the apparatus setting information of the other apparatus which is not registered in the image forming apparatus out of the apparatus setting information of the other apparatus obtained by said acquiring unit;

a display unit that displays on a display the apparatus setting information of the other apparatus which is not registered in the image forming apparatus and which has been extracted by said extracting unit, together with the apparatus setting information registered in the image forming apparatus;

an information selecting unit that selects desired apparatus setting information out of the apparatus setting information of the other apparatus which is not registered in the image forming apparatus and the apparatus setting information registered in the image forming apparatus, which are displayed by said display unit; and a setting unit that performs setting of function or operation corresponding to the selected apparatus setting information.

2. An image forming apparatus as claimed in claim 1, comprising a registration selecting unit that selects whether or not the extracted apparatus setting information of the other apparatus which is not registered in the image forming apparatus is to be registered as apparatus setting information of the image forming apparatus.

3. An image forming apparatus as claimed in claim 1, comprising a data transmitting unit that transmits data to a desired transmission destination via the communication line, and wherein the apparatus setting information is for setting the transmission destination.

4. An image forming apparatus as claimed in claim 3, wherein the apparatus setting information is information selected from the group consisting of a facsimile number of the transmission destination, an e-mail address of the transmission destination, a folder of the transmission destination, and a box of the transmission destination.

5. A communication apparatus capable of registering apparatus setting information for setting the communication apparatus, comprising:

an acquiring unit that obtains apparatus setting information registered in at least one other apparatus connected to the image forming apparatus via a communication line, from the other apparatus;

an extracting unit that extracts the apparatus setting information of the other apparatus which is not registered in the communication apparatus, out of the apparatus setting information of the other apparatus obtained by said acquiring unit;

a display unit that displays on a display the apparatus setting information of the other apparatus which is not registered in the communication apparatus and which has been extracted by said extracting unit, together with the apparatus setting information registered in the communication apparatus;

an information selecting unit that selects desired apparatus setting information out of the apparatus setting information of the other apparatus which is not registered in the communication apparatus and the apparatus setting information registered in the communication apparatus, which are displayed by said display unit; and a setting unit that performs apparatus setting corresponding to the selected apparatus setting information.

6. A communication apparatus as claimed in claim 5, comprising a registration selecting unit that selects whether or not the extracted apparatus setting information of the other apparatus which is not registered in the communication apparatus is to be registered as apparatus setting information of the communication apparatus.

7. A communication apparatus as claimed in claim 5, comprising a data transmitting unit that transmits data to a desired transmission destination via the communication line, and wherein the apparatus setting information is for setting the transmission destination.

8. A communication apparatus as claimed in claim 7, wherein the apparatus setting information is information selected from the group consisting of a facsimile number of the transmission destination, an e-mail address of the transmission destination, a folder of the transmission destination, and a box of the transmission destination.

9. An apparatus setting method of performing apparatus setting for an apparatus which is capable of registering apparatus setting information for performing setting of at least one of functions or operations thereof, comprising:

an acquiring step of obtaining apparatus setting information registered in at least one other apparatus connected to the apparatus via a communication line, from the other apparatus;

an extracting step of extracting apparatus setting information of the other apparatus which is not registered in the apparatus out of the apparatus setting information of the other apparatus obtained in said acquiring step;

a display step of displaying on a display the apparatus setting information of the other apparatus which is not registered in the apparatus and which has been extracted in said extracting step, together with apparatus setting information registered in the apparatus;

an information selecting step of selecting desired apparatus setting information from the apparatus setting information of the other apparatus which is not registered in the apparatus and the apparatus setting information registered in the apparatus, which are displayed in said display step; and a setting step of performing setting of function or operation corresponding to the selected apparatus setting information.

10. A computer-readable storage medium which stores the program for causing a computer to execute an apparatus setting method applied to an apparatus which is capable of registering apparatus setting information for performing setting of at least one of functions or operations thereof, said program comprising;

an acquiring module for obtaining apparatus setting information registered in at least one other apparatus connected to the apparatus via a communication line, from the other apparatus;

an extracting module for extraction apparatus setting information of the other apparatus which is not registered in the apparatus out of the apparatus setting information apparatus which is not registered in the apparatus out the apparatus setting information of the other apparatus obtained by said acquiring module;

a display module for displaying on a display the apparatus setting infromation of the other apparatus which is not registered in the apparatus and which has been extracted by said extracting module, together with apparatus setting information registered in the apparatus;

an information selection module selection module for selecting desired apparatus setting information from the apparatus setting information of the other apparatus which is not registered in the apparatus and the apparatus setting information registered in the apparatus, which are displayed by said display module; and a setting module for performing setting of function of operation corresponding to the selected apparatus setting information.

* * * * *

UNITED STATES PATENT AND TRADEMARK OFFICE
CERTIFICATE OF CORRECTION

PATENT NO. : 7,108,436 B2  Page 1 of 1
APPLICATION NO. : 11/223752
DATED : September 19, 2006
INVENTOR(S) : Yasuaki Sawano It is certified that error appears in the above-identified patent and that said Letters Patent is hereby corrected as shown below:

Column 10, line 64, delete " in a step S1 " and insert -- in a step S11 --

Signed and Sealed this

Fourth Day of September, 2007

JON W. DUDAS
*Director of the United States Patent and Trademark Office*